(12) United States Patent
Tarditi

(10) Patent No.: US 6,625,808 B1
(45) Date of Patent: Sep. 23, 2003

(54) METHOD AND APPARATUS FOR FACILITATING MEMORY MANAGEMENT IN A PROGRAM COMPRISED OF HETEROGENEOUS COMPONENTS

(75) Inventor: David R. Tarditi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/459,241

(22) Filed: Dec. 10, 1999

(51) Int. Cl.[7] .............................................. G06F 9/45
(52) U.S. Cl. ...................... 717/154; 717/158; 707/206
(58) Field of Search ........................ 717/141, 151–154, 717/157, 158; 707/206; 711/132, 135, 159, 170

(56) References Cited

U.S. PATENT DOCUMENTS

| | | | | |
|---|---|---|---|---|
| 5,590,332 A | * | 12/1996 | Baker ........................... | 717/151 |
| 5,761,477 A | * | 6/1998 | Wahbe et al. .................. | 709/1 |
| 6,314,557 B1 | * | 11/2001 | Shenderovich .............. | 717/131 |
| 6,381,738 B1 | * | 4/2002 | Choi et al. ................... | 717/154 |
| 6,434,742 B1 | * | 8/2002 | Koepele, Jr. ................ | 717/140 |

OTHER PUBLICATIONS

John R. Ellis & David L. Detlefs, "Safe, Efficient Garbage Collection for C++," Xerox Corporation, 1993, pp. 1–76. Retrieved on <URL> =http://citeseer.nj.nec.com/ellis93safe.html.*

Kenjiro Taura & Akinori Yonezawa, "An Effective Garbage Collection Strategy for Parallel Programming Languages on Large Scale Distributed–Memory Machines," Proceedings of the sixth ACM SIGPLAN symposium, 1997, pp. 264–275.*

Matsuoka et al., "A Fast Parallel Conservative Garbage Collector for Concurrent Object–Oriented Systems," Proceedings or IEEE International Workshop on Object Orientation in Operating Systems, 1991, pp. 87–93.*

* cited by examiner

Primary Examiner—Tuan Q. Dam
(74) Attorney, Agent, or Firm—Lee & Hayes, PLLC

(57) ABSTRACT

A method comprising identifying points of transition between garbage collected program components and non-garbage collected program components of a heterogeneous program, and selectively invoking a transition function. The transition function maintains a traceable history of select pointer and state information across a plurality of calls to and from non-garbage collected program components to support garbage collection throughout execution of the heterogeneous program.

50 Claims, 8 Drawing Sheets

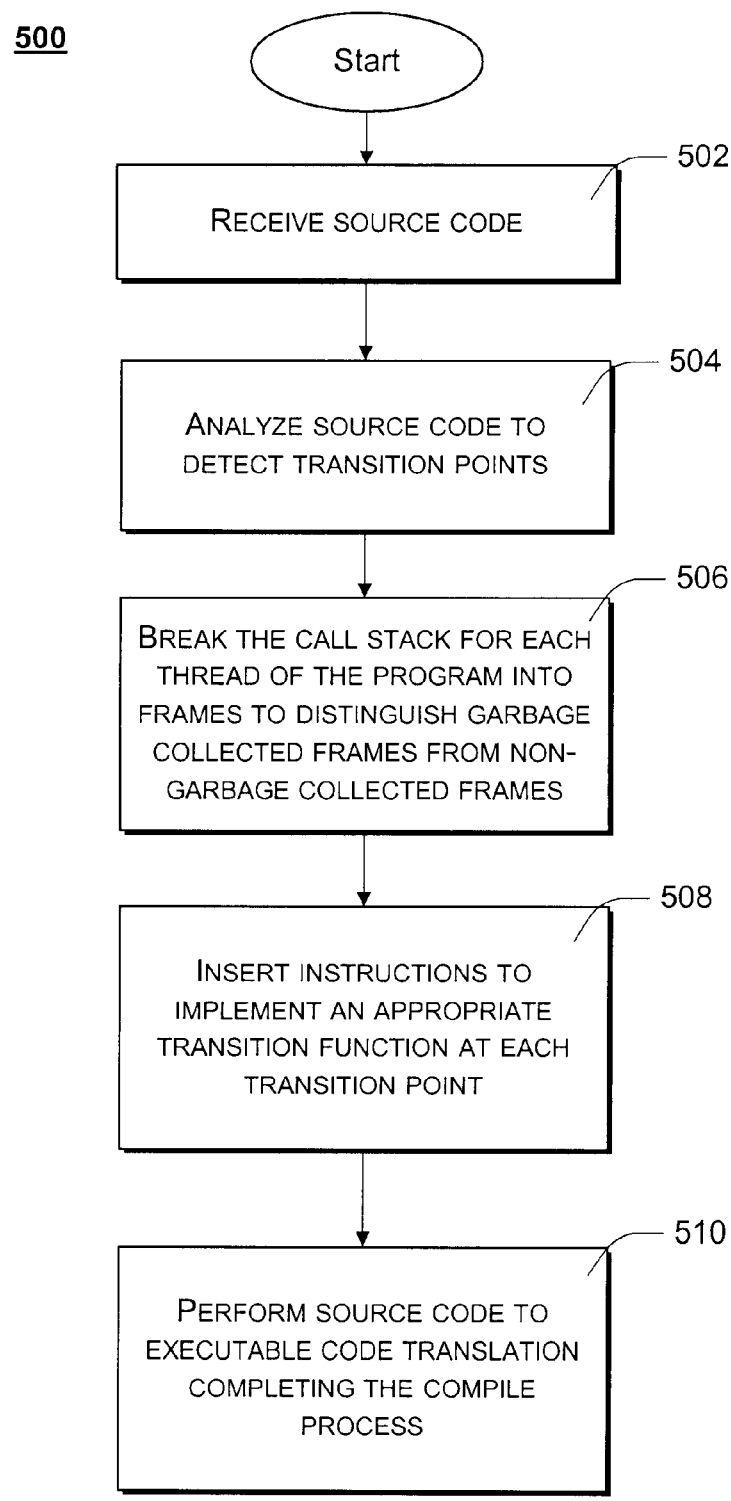

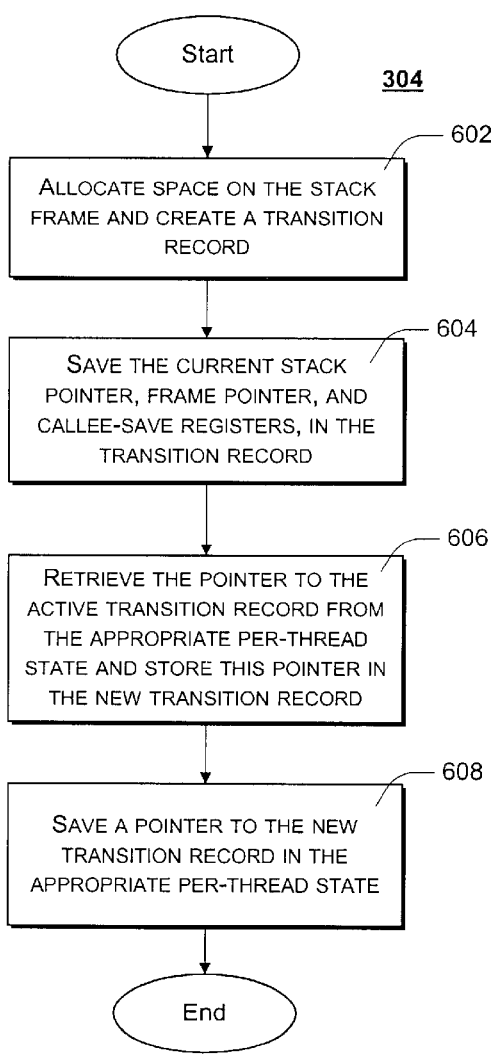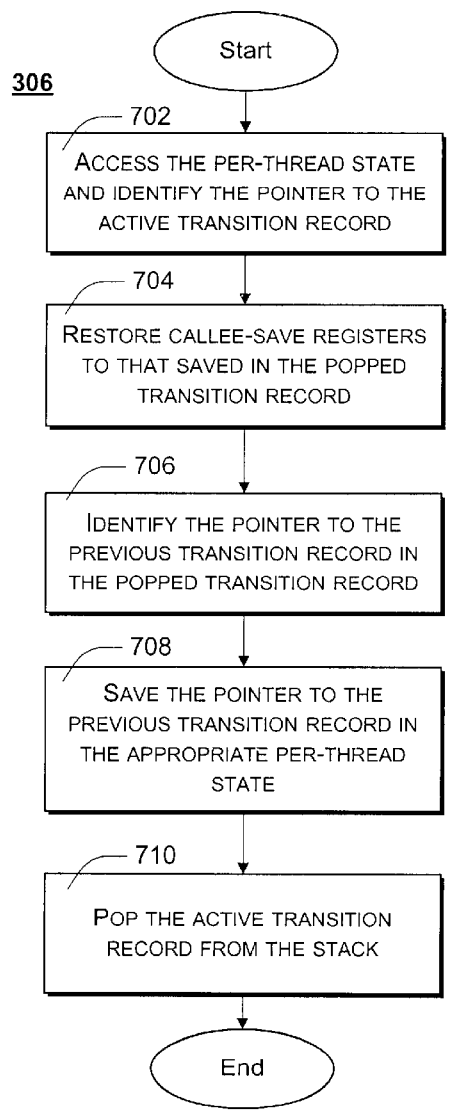

METHOD AND APPARATUS FOR FACILITATING MEMORY MANAGEMENT IN A PROGRAM COMPRISED OF HETEROGENEOUS COMPONENTS

TECHNICAL FIELD

This invention generally relates to memory management and, in particular, to a method and apparatus for facilitating memory management among heterogeneous elements of a program.

BACKGROUND OF THE INVENTION

Legacy programming languages such as, for example, the Pascal, Fortran and C languages are well known. Developing source code using one of these legacy programming languages typically requires a programmer to embed instructions within their code to "manually" manage the memory resources of the executing computer. That is a programmer writing source code in one of these legacy languages must embed instructions within the code to allocate memory to support objects created during execution of the program, and must subsequently explicitly reclaim these resources when the stored object is no longer required. For small programs this manual memory management is an inconvenience for the programmer, but typically not overwhelming. However, as the size of a program and the number of simultaneously executing threads of a program increase, the programmer has a heightened burden to reclaim memory resources when the objects stored within such resources are no longer required by the program, i.e., "garbage" or "dead" objects.

Failure to reclaim memory allocated to dead objects may well result in the all too-familiar memory "overflow" and "out of memory" conditions leading to the premature conclusion of an executing program. Historically, the manual management of memory resources, i.e., comprising static memory, stack memory and/or the heap, depending on the data structures employed by the programming language, has been prone to error for all but the most experienced and skilled programmers.

To alleviate this burden of memory management, more advanced programming languages have been developed that include automated memory management functions. Languages such as the Java™ language by Sun Microsystems, the Standard ML (SML) language developed at Edinburgh University and implemented by Bell Laboratories (now Lucent Technologies), and the well-known LISP programming language developed at the Massachusetts Institute of Technology (MIT) each include automated memory reclamation functions within their runtime environment. In general, memory for objects (i.e., software "bundles" of variables and related methods) is explicitly allocated on the heap by the program and implicitly reclaimed by a function of the runtime environment (e.g., the Java™ Virtual Machine) when no longer needed. This process of implicitly reclaiming memory resources from dead objects is colloquially referred to as garbage collection.

Typically, the garbage collection function is implemented as an implicit function of the memory allocation function. That is to say, when a program attempts to create an object, the runtime environment accesses a "list" to ensure that adequate heap memory is available. If, while attempting to create an object it is determined that inadequate heap memory exists, the runtime environment invokes the garbage collection function to identify "dead" objects, i.e., those objects no longer reachable by the program, and reclaim such memory for use by future objects.

A number of different garbage collection techniques exist, e.g., "copying" garbage collectors, "mark-and-sweep" garbage collectors and "generational" garbage collectors to name a few. Although the techniques employed by these garbage collectors vary from one to another, they each generally employ a two-step garbage collection process of: (1) identifying dead objects on the heap; and (2) reclaiming memory associated with the dead objects.

To identify dead objects, the garbage collector performs a function colloquially referred to as "walking the stack" for each thread within a program. To walk the stack, the garbage collector analyzes the "root set", i.e., the static registers and stack memory for each thread of a program, to identify pointers to objects stored on the heap. The garbage collector follows these pointers to the objects within the heap, and follows any pointers embedded therein to further objects. In this way, the garbage collector may traverse several layers of object pointers to identify all live objects. It stands, therefore, that all objects which are not ultimately traceable back to the root set are unreachable by the program, i.e., a dead object, and is subject to garbage collection.

To reclaim memory from dead objects, the address(es) for memory allocated to dead objects are added to the list of available heap memory. Thus, when the program attempts to create a new object and the list is accessed, the heap memory currently allocated to a dead object is overwritten with the new "live" object.

Programming languages, such as the advanced programming languages introduced above, which include automated memory management features such as, for example, garbage collection, are often referred to as garbage collected languages. In contrast, programming languages that do not include this automated garbage collection feature. e.g., the legacy programming languages introduced above, are typically referred to as non-garbage collected languages.

Typical of innovations of convenience, the prevailing thought when these advanced programming languages were first developed is that they would be so widely accepted and embraced by the development community that they would replace the legacy programming languages, rendering code developed in legacy programming languages obsolete. Indeed, the advanced programming languages were and are widely embraced in the development community. However, experience shows that it is often more convenient, and sometimes necessary, to utilize code written in legacy programming languages than to attempt to "re-write" the code using an advanced language. For example, it may be more convenient or necessary for a program written in a garbage collected language to call an application program interface (API), or dynamic linked libraries (DLL) written in C/C++. Recognizing this need, nearly every runtime environment for an advanced programming language now provides a foreign function interface to support calls to "foreign functions" (e.g., API's, DLL's and the like) written in legacy code.

Typically, the foreign function interface is an array of pointers to legacy functions, loaded as a library in the advanced programming language for the application. When making a call to a foreign function, the calling application typically provides an address to a re-entry point within the application. It must be appreciated by the developer utilizing the foreign language function call that when the call is made to the foreign function, the runtime environment for the advanced programming language is "suspended" while the foreign function executes. As a consequence, the automated memory management facilities of the advanced programming language are similarly suspended. Any memory management that is performed during execution of the foreign function is in response to explicit memory management commands embedded within the foreign function. Insofar as the foreign function employs data structures that are different from, yet occupy the same address space as, the data structures of the advanced programming language, it is probable that the manual memory management of the foreign language function will corrupt pointers to objects stored within the heap, especially if the objects are utilized or referenced by the foreign function. As described above, the garbage collection function relies on such pointers to identify live objects on the heap. At best, corruption of the pointers retards the garbage collectors ability to reclaim memory from dead objects and, at worst, the corruption of the pointers may eliminate a reference to a live object that will be needed during the subsequent execution of the program. Indeed, the foreign function may even corrupt the objects themselves as it allocates and reclaims memory in support of its execution.

Currently, none of the foreign function interfaces associated with these advanced programming languages can ensure that pointers to live objects are maintained through a call to a foreign function. This limitation is significant in that it prevents the runtime environment of the advanced programming languages from supporting an arbitrary number of calls to and from foreign functions and still be able to perform automated memory management, i.e., garbage collection. Restated, although advanced programming languages support a call to a foreign function through a foreign code interface, it is at the cost of the automated memory management features of the advanced programming language.

Recognizing this limitation, some attempts at obvious solutions have been made to resolve this problem, i.e., to walk the stack for a program comprised of heterogeneous program components. In a first approach, frame pointers were used to walk the stack. Given a frame pointer fp for some call frame, (1) the address of its caller, i.e., the return address, is that memory location fp+4; and (2) the frame pointer for its caller is at memory location fp. Table 1, below, presents a function that walks the stack given the current value in the frame pointer register.

```
void stackWalk(char*origfp) {
  char *fp=origfp;
  do {
    addr=*(fp+4);
    fp=(char *) *fp;
    /* process current frame */
    process (addr,fp)
  }while (fp is valid)
}
```

Table 1: Walking the Stack using Frame Pointer

This approach does not work because compiled C functions, for example, may omit the frame pointer altogether. Consequently, when attempting to utilize frame pointers to walk the call stack for a thread comprised of heterogeneous program components, e.g., Java™ components and C components, and certain of the program components fail to maintain the frame pointer, the automated memory management facility breaks down.

Under a second approach, an application program interface (API) that is included by the Microsoft Windows® operating system (from Microsoft Corp. of Redmond, Wash.) for obtaining a stack trace as part of the ImageHlp API is relied upon to walk the stack. Those skilled in the art will appreciate that this "StackWalk" API is designed to be used by debuggers in debugging tools, such as memory leak detectors. This approach does not work well for several reasons. First, the StackWalk API assumes that the thread whose stack it is walking is stopped. Consequently, in a single threaded case where the garbage collector tries to walk its own stack using the StackWalk API, garbage results are produced as the function from the stack changing underneath it. Even placing the garbage collector on a separate thread does not necessarily solve the problem, as garbage collection typically runs while the system is in a safe state but not necessarily when all threads are stopped. Third, the StackWalk API has no way of detecting that it has reached the end of the stack. In fact, when running sample programs, the API walked off the stack for one of the callback threads and returned an incorrect value for the frame pointer to the garbage collector. Finally, use of the StackWalk API leads to a serious performance degradation. As a consequence, this otherwise obvious approach was deemed unacceptable for implementation.

The problem with the above solutions is that each make certain assumptions about the operation and/or memory management employed by the non-garbage collected language program component. That is, each of the foregoing solutions may have worked were it feasible, or even possible, to modify the foreign function to conform to these assumptions. Given, however, that the source code for Windows API's and DLL's are not typically available for modification to conform to these assumptions, the above solutions are not feasible.

Accordingly, a method and system supporting automated memory management in a program of heterogeneous program components is required that does not make any assumptions about the operation and/or memory management employed by any non-garbage collected program components. Just such a solution is provided below.

SUMMARY OF THE INVENTION

This invention generally concerns a method and system for facilitating automated memory management among heterogeneous components of a computer program.

According to a first aspect of the present invention, a method facilitating garbage collection in a program comprising heterogeneous program components is presented. The method begins by identifying transition points between the heterogeneous program components. A transition function is positioned at each transition point to maintain a history of select pointer and state information throughout program execution. By preserving a history of select pointer and state information, the transition function facilitates an arbitrary number of calls between two or more heterogeneous program components without the loss of pointer information necessary for a garbage collection function to accurately identify live objects.

The transition function, as will be described more fully below, is actually comprised of a creation function and a restoration function. The creation function creates a transition record during a transition from a first program component type and a second program component type. The creation function then populates the newly created transition record with select pointer and state information, and stores a pointer to the new transition record in the per-thread state, before continuing to the second program component type.

Upon return from the second program component type to the first program component type, the restoration function is invoked. The restoration function accesses the per-thread state for each thread executing within the program and loads the pointer to the transition record. The restoration function then pops the transition record and restores the pointer and state information contained therein. In addition, the restoration function then stores a pointer to an immediate prior transition record in the per-thread state.

By selectively invoking an appropriate one of the transition functions, the pointer and state information necessary to support garbage collection is maintained across heterogeneous program components. According to a first implementation, the transition function is automatically added to the compiled code for the heterogeneous program by an innovative compiler. The compiler includes an analysis agent, which receives the source code and identifies transition points. The analysis function then automatically generates the appropriate code to integrate with the received program to implement an appropriate transition function at the transition point. Thus, if a creation function is required, the analysis agent interjects code to implement the creation function. Likewise, if the restoration function is called for, the analysis agent automatically generates and places the code required to implement the restoration function.

In an alternate implementation, the transition functions may well be incorporated into the runtime environment for the programming language. That is, the runtime environment includes an analysis agent which detects transition points in the executing heterogeneous program. At such transition points, the analysis agent of the runtime environment invokes instances of the creation function or the restoration function, according to the teachings of the present invention. Accordingly, it is to be appreciated that the present invention may well be practiced in alternate forms without deviating from the spirit and scope of the present invention.

BRIEF DESCRIPTION OF THE DRAWINGS

FIG. 5 is a flow chart illustrating the method steps for compiling a heterogeneous program according to the teachings of the present invention;

FIG. 6 is a flow chart illustrating the method steps of an example creation function supporting automated memory management between heterogeneous program components, according to one aspect of the present invention;

FIG. 7 is a flow chart illustrating the method steps of an example restoration function supporting automated memory management between heterogeneous program components, according to one aspect of the present invention;

DETAILED DESCRIPTION

Example Computer System

As described herein, the invention is introduced in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 1:
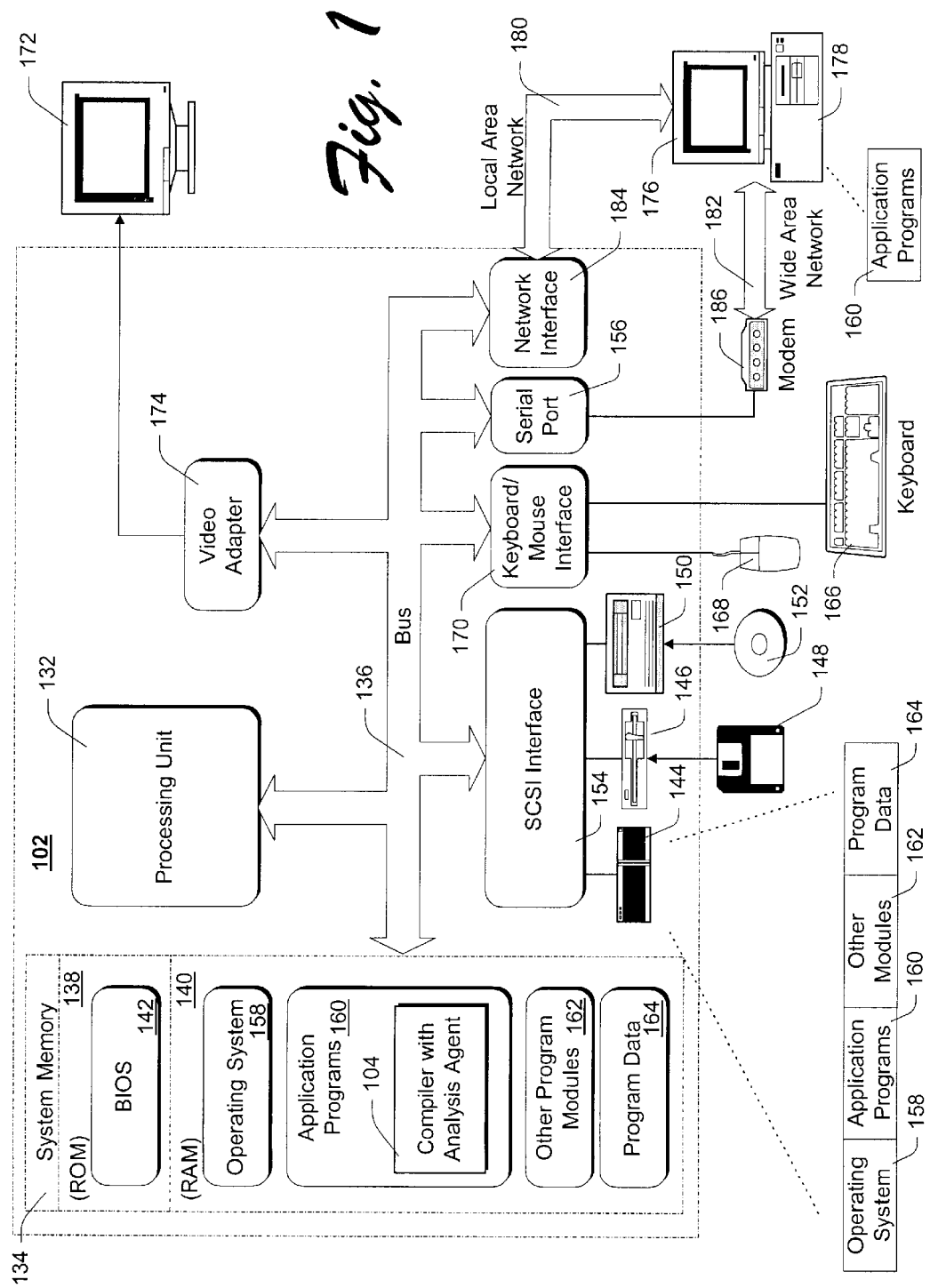
FIG. 1 is a block diagram of an example computer suitable for use in accordance with the teachings of the present invention.

FIG. 1 shows a general example of a computer system 102 incorporating the teachings of the present invention. It will be evident, from the discussion to follow, that computer 102 is intended to represent any of a class of general or special purpose computing platforms which, when endowed with the innovative compiler 104, implement the teachings of the present invention in accordance with the first example implementation introduced above. It is to be appreciated that although only the compiler embodiment is depicted, computer system 102 may support the runtime implementation of the present invention as well. In this regard, but for the description of compiler 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative compiler 104 incorporating the teachings of the present invention, other program modules 162 including a runtime environment associated with an advanced programming language incorporating the teachings of the present invention, and program data 164. A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Compiler with Analysis Agent

Figure 2:
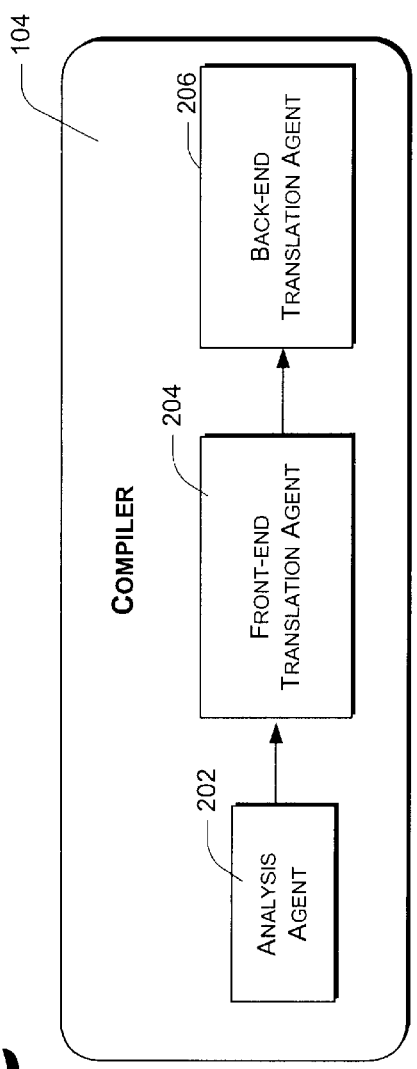
FIG. 2 is a block diagram of an example compiler including an analysis agent, according to one aspect of the present invention.

FIG. 2 illustrates a block diagram of an example compiler incorporating the teachings of the present invention. As shown, compiler 104 includes an analysis agent 202, a front-end translation agent 204, and a back-end translation agent 206, each coupled as depicted. As described above, the general purpose of any compiler, including compiler 104, is to receive program code written in a high-level program language and to generate machine executable (sometimes referred to as operational, or "op") code in order to execute the program on a computer, e.g., computer system 102.

The translation function of a compiler is typically broken into two separate functional blocks to facilitate code reuse. A front-end translation agent 204 is specific to the particular high-level programming language supported by the compiler. It is designed to translate the high-level language to an intermediate-level language. A common intermediate-level language is the static single-assignment (SSA) form. According to the SSA form, each variable has only one definition in the translated program text. That is, in translating the high-level program language into SSA, front-end translation agent 204 renames variables such that each variable is used only once throughout a program.

Those skilled in the art will appreciate that creating the compiler in accordance with this object-oriented format facilitates code reuse, and enables compiler manufacturer's to reuse front-end translation agents and back-end translation agents in a number of different combinations to support a number of different programming language-processing platform combinations. For purposes of this application, and for consistency and ease of illustration, further references to high-level programming language will be made to Java™ language components. It is to be appreciated, however, that the fundamental aspects of the present invention may well be applied to any advanced programming language.

According to one implementation of the present invention, in addition to the translation agents described above, compiler 104 is shown comprising analysis agent 202. As will be developed more fully below, analysis agent 202 receives source code for the high-level programming language, identifies transition points from one program component type to another, and automatically generates code which, when executed, will implement an appropriate transition function. As described above, the transition function serves to preserve select pointer and state information to support the garbage collection function of the runtime environment of the advanced programming language.

Analysis agent 202 receives the source code and identifies transition points in the received code by detecting calls to foreign functions and returns from foreign functions within the source code of the received high-level programming language. Once identified, analysis agent 202 automatically generates and inserts the code necessary to implement a transition function in the program flow for that thread. The type of transition function inserted will depend on whether the detected transition point is going to or coming from the foreign function. More specifically, analysis agent 202 will insert a creation function at a transition point from the advanced programming language to a foreign function. Conversely, analysis agent 202 will insert a restoration function at a transition point from a foreign function back to the advanced programming language.

As will be described in greater detail below, when execution of the program proceeds to a creation function, the creation function creates a transition record on the stack frame of the particular thread in which the function call is identified. The transition record is populated with select pointer and state information. In addition, the creation function stores a pointer to the newly created transition record in the per-thread state. Once the transition record is created and the creation function has completed its task of preserving select pointer and state information, execution of the program continues into the foreign function.

Once the foreign function has completed its execution, the program continues to execute the restoration function. The restoration function accesses the per-thread state and loads the pointer to the transition record. It will be appreciated, that the pointer to the transition record stored in the per-thread state is a pointer to the youngest advanced programming language component in the call stack, i.e., the component executed immediately prior to the foreign function call. Having identified the transition record, the restoration function restores the select pointer and state information from the transition record as program execution continues.

It will be appreciated that as objects are created during execution of the program and the garbage collection function is called upon, the preservation of select pointer and state information across any number of foreign function calls enables the garbage collection function of the runtime environment to successfully walk the stack in identified live objects. In this way, the transition functions of the present invention overcome limitations commonly associated with the prior art, enabling a programmer to successfully embed any number of foreign function calls in code developed in an advanced programming language without giving up the garbage collection features of the advanced programming language.

Figure 3:
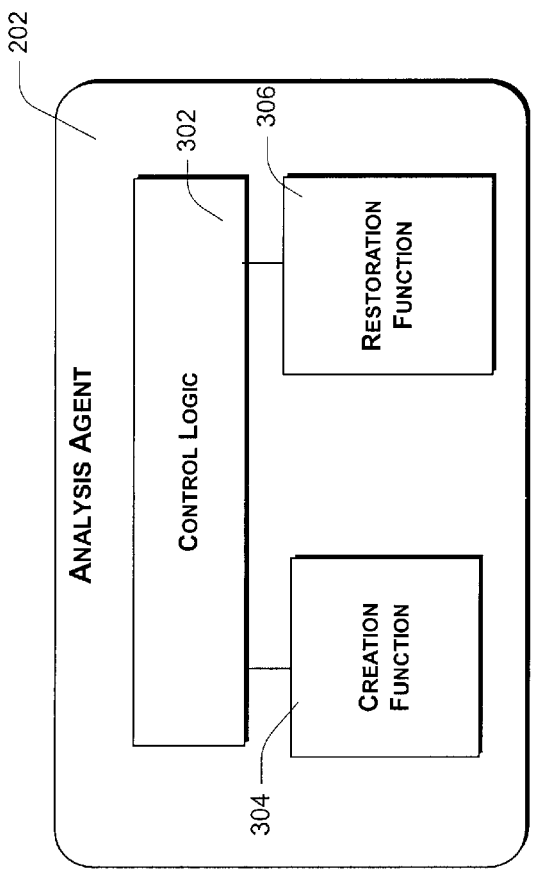
FIG. 3 is a block diagram of the analysis agent of FIG. 2, according to one embodiment of the invention.

FIG. 3 presents a block diagram of analysis agent 202 incorporating the teachings of the present invention, in accordance with one embodiment of the present invention. As shown, analysis agent 202 comprises control logic 302, creation function 304, and restoration function 306, communicatively coupled as depicted. Control logic 302 receives the source code for the advanced programming language and identifies transition points from program components written in the advanced programming language to components written in a legacy programming language. As alluded to above, control logic 302 identifies such transition points by detecting foreign function calls within the received source code. For each foreign function call made from the advanced programming language, a return point to the advanced programming language is included in the foreign function call. Accordingly, control logic 302 also identifies the transition point from the foreign function back to the advanced programming language component from the identified return point.

Based on the type of transition point identified, control logic 302 selectively inserts executable code to implement either creation function 304 or restoration function 306. As described above, for every transition from an advanced programming language component to foreign function control, logic 302 inserts instructions to implement creation function 304. As will be described in greater detail below, when creation function 304 is invoked, it creates a transition record on the stack frame of the program thread in which the foreign function call is found, and loads a pointer to the last transition record from the per-thread state. Creation function 304, in association with control logic 302, identifies pointers to objects created within the component that are stored on the heap and stores such pointers in the transition record. In addition, callee-save registers, the stack pointer, the frame pointer, and the pointer to the last transition record are also stored within the transition record. A pointer to the new transition record is then saved in the per-thread state.

Upon the return from a foreign function to the advanced programming language component, the restoration function 306 is invoked. Restoration function 306 accesses the per-thread state information to load the pointer to the current transition record. Restoration function 306 then uses the current transition record identified in the per-thread state to restore the callee-save registers, as well as pointers to objects stored in the popped transition record. Restoration function 306 then loads the pointer to the previous transition record that is stored in the current transition record. It stores the pointer to the previous transition record in the per-thread state and pops the current transition record.

Program execution continues in this manner, wherein heterogeneous program components are separated by an appropriate transition function which preserves select pointer and state information necessary to perform garbage collection. If the garbage collection function is called during execution of the program, the garbage collector will be able to successfully walk the stack frame for each thread with transition records providing the necessary pointer and state information to traverse any number of foreign function calls embedded within the program. Thus, it is to be appreciated that the creation and restoration transition functions 304 and 306, respectively, preserve select pointer and state information from an advanced programming language "chunk" through a foreign function call and back to the next advanced programming language component to provide a seamless continuity of information necessary to perform garbage collection on a heterogeneous program.

EXAMPLE DATA STRUCTURES

Figure 4:
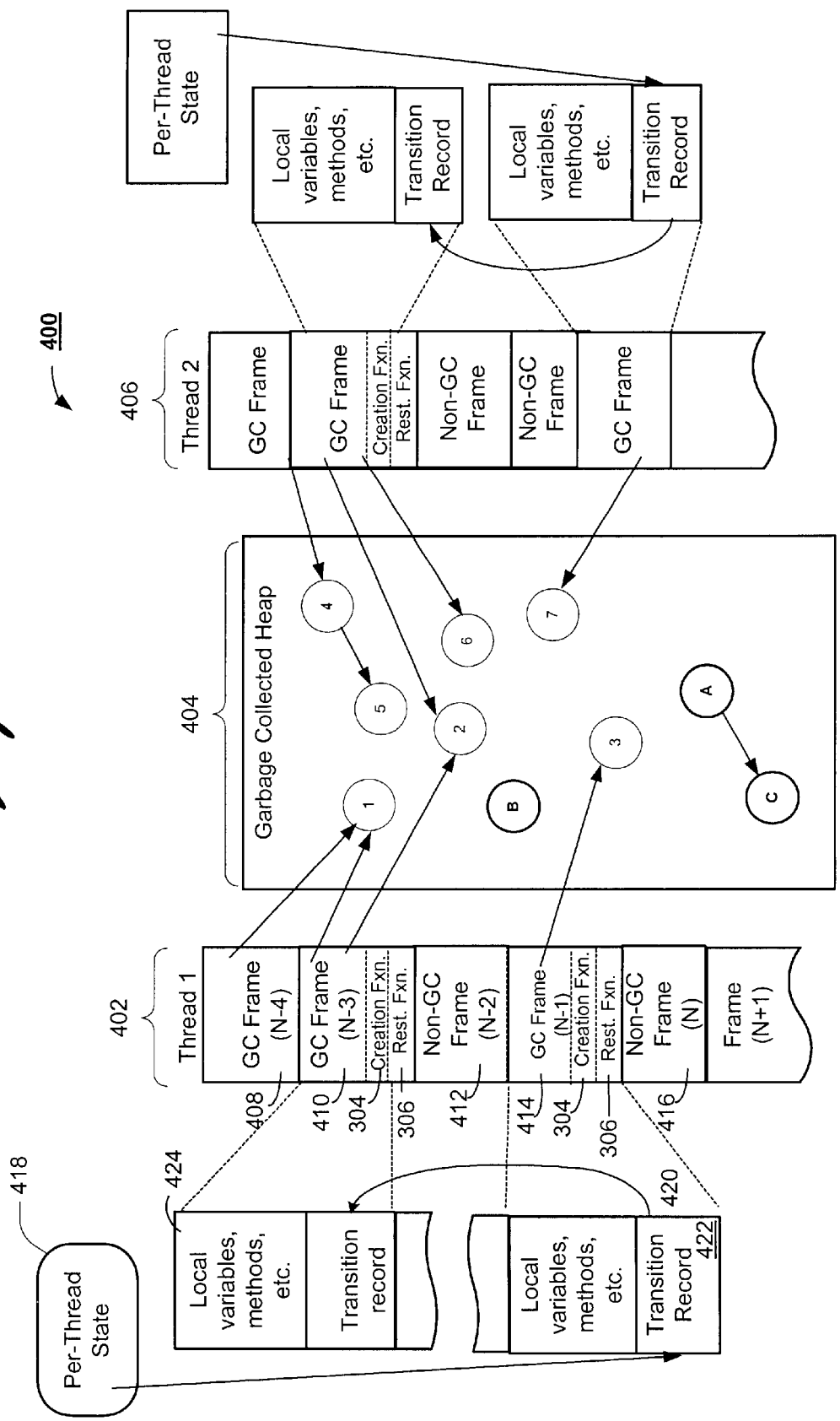
FIG. 4 is a block diagram graphically illustrating the use and maintenance of example data structures according to the teachings of the present invention.

Having introduced the architectural foundation and operating environment of the present invention with reference to FIGS. 1–3, above, the operation of the present invention will now be developed. To fully appreciate the discussion to follow, however, it may prove useful to review an illustration of the data structures employed in accordance with the teachings of the present invention. Accordingly, FIG. 4 illustrates a block diagram of the data structures utilized in accordance with the teachings of the present invention. As shown, the data structures include call stacks 402 and 406 associated with two separate threads of program execution sharing a common, garbage collected heap 404. Associated with each call stack are stack frames, e.g., 422 for call stack 402, and a per-thread state, e.g., 418 for call stack 402.

The garbage collected heap 404 is populated with live objects 1–7 and dead objects, or "garbage", A–C. As described above, a live object is an object which has an identifiable pointer in the root set, e.g., call stack 402 or 406. As shown, objects 1–7 are each traceable to pointers in the call stack 402 for thread 1 and in the call stack 406 for thread 2. In contrast, a dead object is one which is not traceable to a pointer in the root set. As shown, objects A–C are not traceable to pointers in the root set and are, therefore, garbage.

With reference to the call stack 402 associated with thread 1, the call stack has been broken into "chunks" or frames 408, 410, 412, 414 and 416 to delineate program components. As shown, the frames are designated as either a GC frame, e.g., frames 408, 410 and 414, or a non-GC frame, e.g., frame 412 and 416. As used herein, GC denotes that the frame was developed in an advanced programming language that supports Garbage Collection, e.g., Java™ Conversely, a non-GC frame was developed in a legacy programming language that does not support garbage collection.

According to the teachings of the present invention, the program occupying call stack 402 and 406 was compiled using innovative compiler 104 as transition functions have been integrated into the program flow for each thread at identified transition points from one program component type to another. More specifically, with reference to call stack 402, creation function 304 has been integrated into the transition point from GC frame 410 to non-GC frame 412 to preserve select pointer and state information through execution of the non-GC component. Similarly, at the return from the non-GC frame 412 to the GC frame 410, restoration function 306 has been integrated to restore the select pointer and state information from GC frame 410 as the program continues to execute with frame 410.

As described above, for each transition from a GC frame to a non-GC frame in the call stack 402, creation function 304 allocates space on the stack frame for a transition record, e.g., transition records 420 and 424. The transition records store select pointer and state information, as well as a pointer to the immediate past transition record, e.g., transition record 424. A pointer to the latest transition record, e.g., transition record 420, is stored in the per-thread state 418 1associated with the call stack 402 for thread 1.

As will be described in more detail below, when the garbage collector function is called, it looks to per-thread state for each thread of the program and pops the pointer to the latest transition record for that thread, e.g., transition record 420. It restores the pointer and state information from within transition record 420 and pushes a pointer to the immediate past transition record 424 to the per-thread state for further reference by the garbage collector, as required. In this way, the transition functions of the present invention facilitate the garbage collection features associated with advanced programming language components of a heterogeneous program.

EXAMPLE OPERATION AND IMPLEMENTATIONS

FIG. 5 is a flow chart illustrating the method steps for compiling a heterogeneous program according to the teachings of the present invention. For ease of explanation the operation of the present invention will be developed with continued reference to FIGS. 1–4.

As shown, the method of FIG. 5 begins with step 502 wherein compiler 104 receives the source code from a development application (not shown). In step 504, analysis agent 202 of compiler 104 receives the source code and begins to analyze the source code for transition points. As described above, control logic 302 of analysis agent 202 reviews the source code to identify foreign function calls. When a foreign function call is detected (denoting a first transition point), control logic 302 identifies the return point from the foreign function (denoting a second transition point).

In step 506, the call stack for each thread of the program is broken into frames denoting program components corresponding to either garbage collected or non-garbage collected source code. In step 508, analysis agent 202 automatically generates instructions to implement an appropriate transition function and incorporates the code into the received source code at each transition point. More specifically, control logic 302 generates executable code to implement a creation function 304 at each call from a garbage collected frame (410) to a non-garbage collected frame (412), or to implement a restoration function 306 at each return from a non-garbage collected frame (412) to a garbage collected frame (410).

In step 510, the source code, including instructions to implement the identified transition functions, are passed to the translation agents to perform the source code to op-code translation as the compiling process continues to completion.

It is to be appreciated, given the above explanation, that innovative compiler 104 automatically incorporates transition functions into a heterogeneous program to enable the developer to make as many calls to and from foreign functions as they like, without worrying that such calls are corrupting the garbage collection features commonly associated with the runtime environment of the advanced programming language. Rather, as described above, the transition functions preserve select pointer and state information through calls to foreign functions, thereby enabling the stack walking features of a garbage collector to accurately find live objects on the heap 404.

Having illustrated an example method for integrating the innovative transition functions in a heterogeneous program to facilitate garbage collection, the operation of the transition functions themselves will now be developed with reference to FIGS. 6 and 7, with continued reference to FIGS. 1–5.

Turning to FIG. 6, a flow chart illustrating the operation of the creation function 304 is presented with additional reference to FIG. 4, according to one aspect of the present invention. As shown, the method of FIG. 6 begins with step 602 where space is allocated on the stack frame 422 for creation of a new transition record 424 for a call from a GC frame 410 to a non-GC frame 412.

In step 604, the current stack pointer, frame pointer and callee-save registers associated with GC frame 410 are saved in the newly created transition record. In addition, a pointer to the immediate past transition record is retrieved from per-thread state 418 and stored in transition record 424, at step 606.

In step 608, a pointer to the newly created transition record 424 is stored in per-thread state 418.

As described above, analysis agent 202 integrates a creation function 304 at each transition from a GC frame to a non-GC frame. Accordingly, when execution of the call stack 402 associated with thread 1 of the program reaches GC frame 414, another transition point is encountered, and the creation function 304 is once a gain invoked. As described above, space for a new transition record 420 is created on stack frame 422 wherein select pointer and state information is stored. A pointer to the (now) immediate past transition record 424 is saved in the newly created transition record 420 and a pointer to transition record 420 is stored in the per-thread state. This process repeats for each transition from a GC frame to a non-GC frame for each thread of a heterogeneous program.

Reference is now made to FIG. 7, which illustrates the method steps of an example restoration function 306, according to one embodiment of the present invention. As shown, restoration function 306 begins with step 702 wherein the per-thread state 418 for a particular call stack 402 is accessed and a pointer to the "active" (or latest) transition record, e.g., transition record 420, is identified. In step 704, the select pointer and state information stored in transition record 420 is restored. More specifically, the callee-save registers are restored to that saved in the transition record 420. In step 706, restoration function 306 identifies the pointer to the immediate past transition record 424 in transition record 420. In step 708, the pointer to the immediate past transition record 424 recovered from transition record 420 is stored in the per-thread state 418. In step 710, transition record 420 is popped from the stack frame 422.

Figure 8:
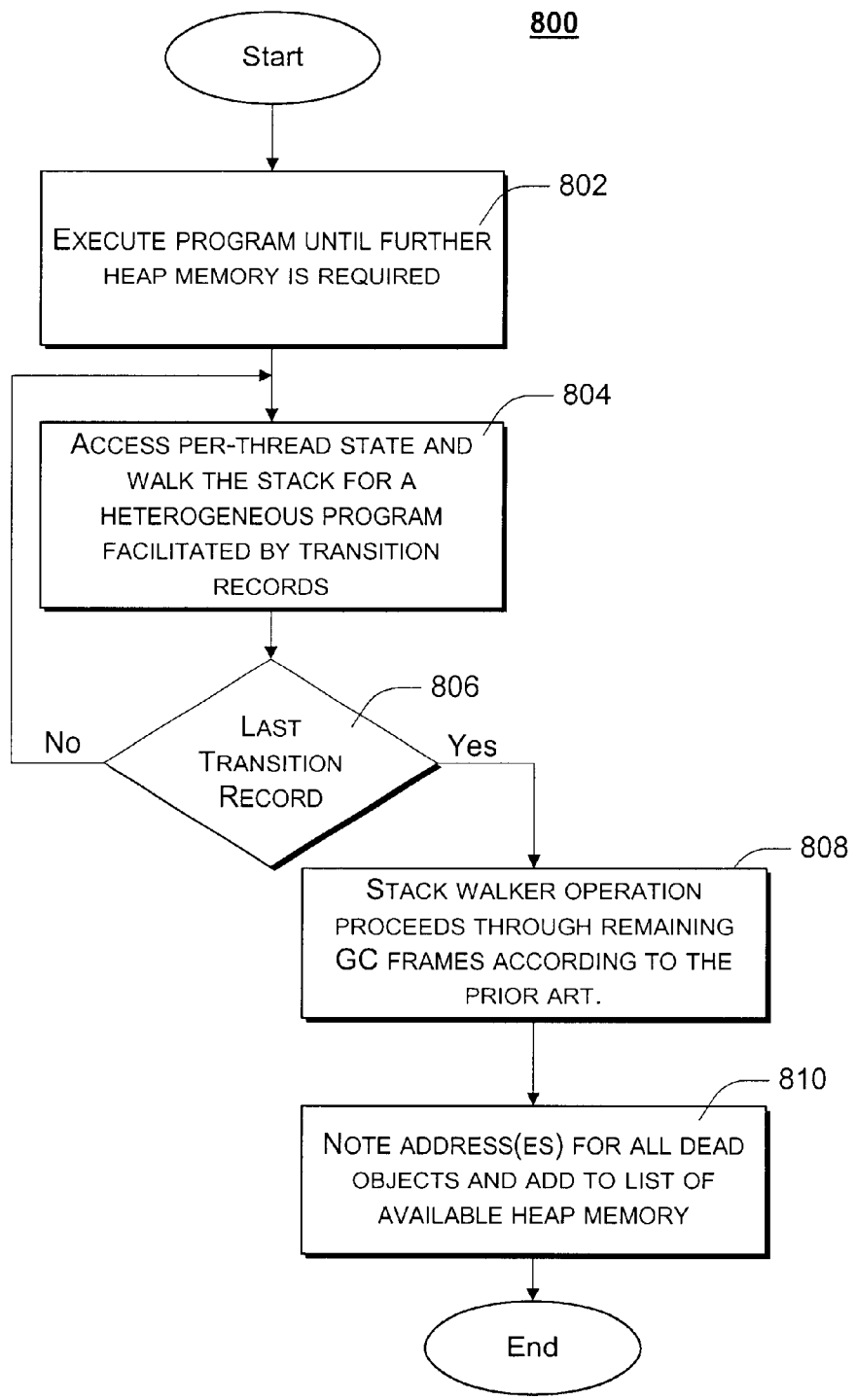
FIG. 8 is a flow chart illustrating the method steps of program execution of a heterogeneous program compiled with the innovative compiler of FIG. 2, according to one embodiment of the present invention.

Having described the operation of the transition functions, above, reference is now made to FIG. 8 in which a flow chart illustrating a method for executing a heterogeneous program incorporating the teachings of the present invention is depicted. As shown, the program begins with step 802 wherein the heterogeneous program is executed within the runtime environment, executing a transition function at each transition point of the heterogeneous program maintaining a history of select pointer and state information in the transition records. As described above, the program will execute until the program attempts to create a new object that cannot be supported by the available memory (i.e., heap) resources. At which point, the runtime environment invokes an instance of the garbage collector function, which for each thread of the program accesses the per-thread state to load the pointer to the latest transition record and begins walking the stack for/that thread of the program, at step 804.

In step 806, a determination is made as to whether the loaded transition record is the last (i.e., oldest) transition record. If not, the process repeats with step 804 and the stack walker continues to walk the stack of GC frames facilitated by the transition records created and populated by the creation function 304.

If, in step 806, the stack walker has reached the last transition record, i.e., the last non-GC frame has been traversed, the stack walking function continues through the remaining GC frames according to the prior art, at step 808.

Once all of the GC frames have been traversed, aided by the transition functions of the present invention, the garbage collector notes the address of all live objects (i.e., traceable to a pointer in the stack frame) 1–7 on the heap 404, and concludes that all remaining addresses are allocated to dead objects A–C. The addresses associated with all dead objects A–C on heap 404 are then added to a list of available heap memory resources, at step 810, and execution of the program continues with creation of the new object using an address previously allocated to a dead object, e.g., A–C.

Figure 9:
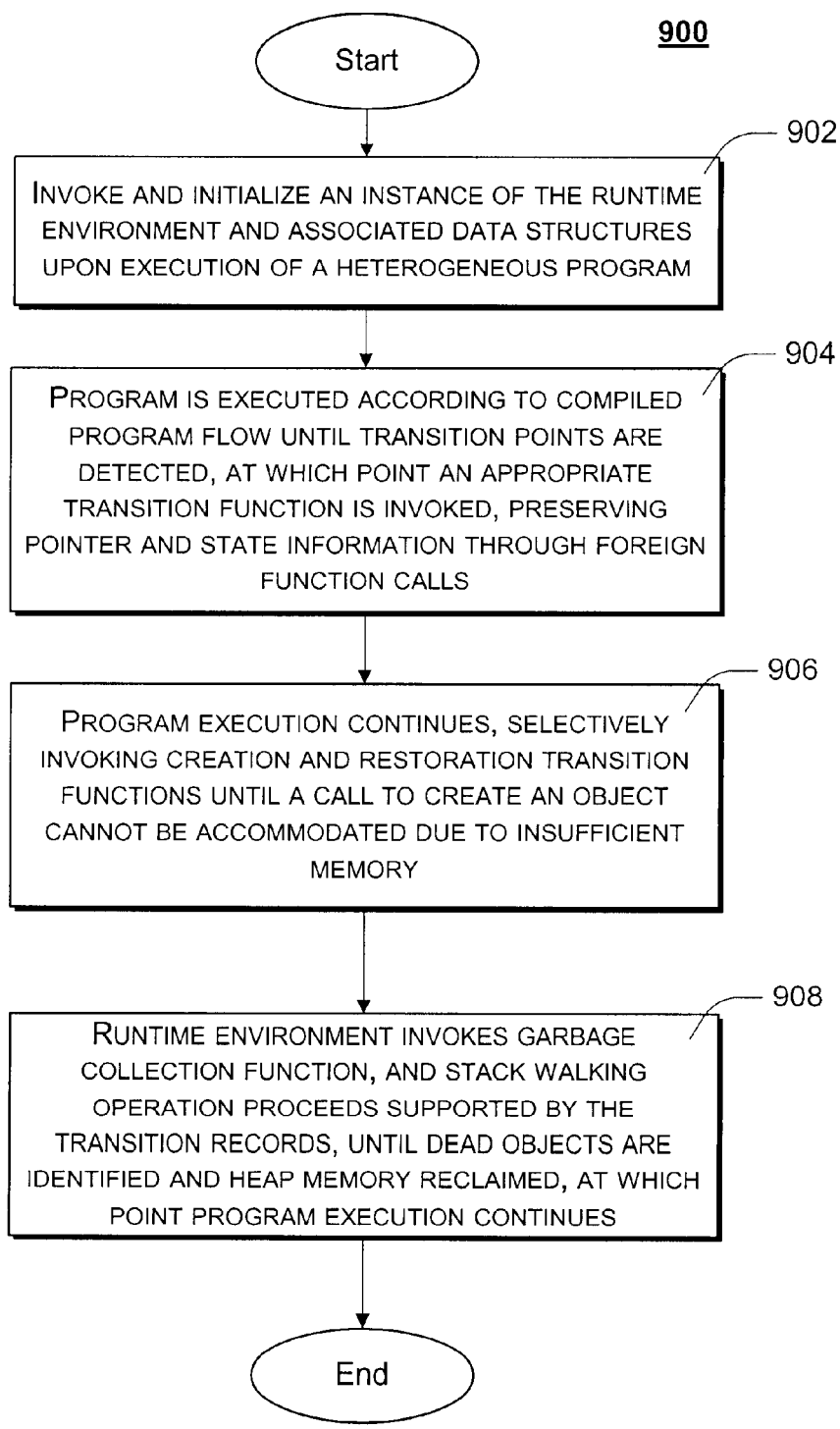
FIG. 9 illustrates a flow chart of the method steps for executing a heterogeneous program, compiled using a prior art compiler, in an innovative runtime environment incorporating the innovative transition functions, according to an alternate embodiment of the present invention.

In addition to the compiler embodiment described above, it is anticipated that the innovative transition functions of the present invention may alternatively be implemented as functions within the runtime environment of a garbage collected language. Thus, reference is now made to FIG. 9, which illustrates a method for executing a heterogeneous program, according to an alternate embodiment of the present invention.

As shown, the method begins with step 902 wherein the runtime environment is invoked and initialized upon execution of a heterogeneous program. In step 904, the program is executed per the compiled program flow until transition points are encountered, at which point the runtime environment selectively invokes an appropriate one of the creation function 304 or restoration function 306 as described in FIGS. 6 and 7, respectively.

Program execution continues in step 906, with the runtime environment selectively invoking necessary transition functions until a request for object creation cannot be accommodated due to insufficient memory, at which time the runtime environment invokes the garbage collection function (not shown) and walks the stack, using the transition records where necessary, to identify and eliminate dead objects at step 908, as described above in FIG. 8.

It will be appreciated that a runtime environment endowed with the transition functions of the present invention support automated memory management in heterogeneous programs compiled using prior art compilers. That is, by incorporating the creation and restoration functions (304 and 306) in the runtime environment itself, the present invention supports heterogeneous program code compiled using legacy compilers.

Figure 10:
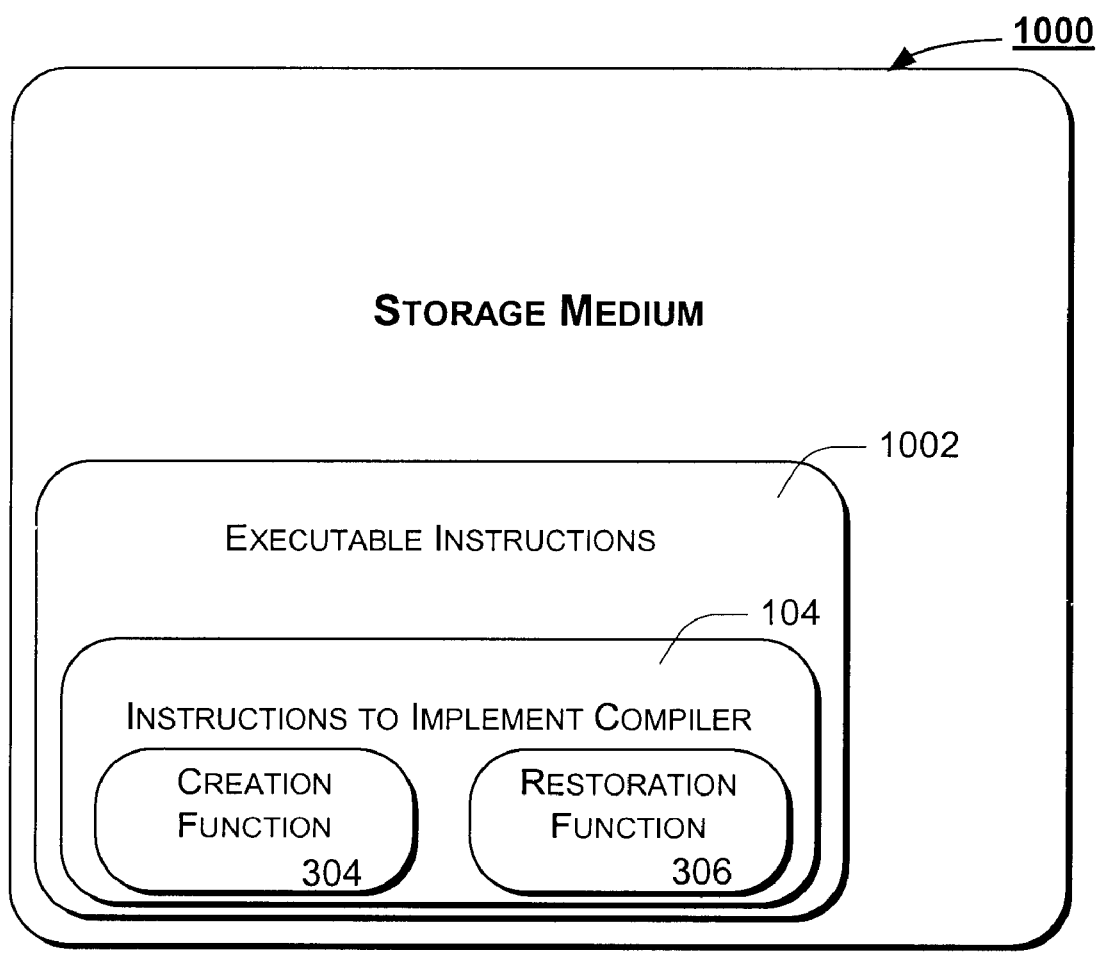
FIG. 10 is a block diagram of an example storage medium having stored thereon a plurality of executable instructions to implement the compiler with the analysis agent and the transition function, according to an alternate embodiment of the present invention.

FIG. 10 is a block diagram of a storage medium having stored thereon a plurality of instructions including instructions to implement the teachings of the present invention, according to yet another embodiment of the present invention. In general, FIG. 10 illustrates a storage medium/device 1000 having stored thereon a plurality of executable instructions 1002 including at least a subset of which that, when executed, implement the compiler 104 with innovative creation function 304 and restoration function 306 of the present invention. When executed by a processor of a host system, the executable instructions implementing compiler with analysis agent 202 identify transition points from one program component type to another and automatically generates instructions necessary to implement an appropriate transition function, i.e., a creation or restoration function, according to the teachings of the present invention. By incorporating the transition function into the compiled code of a heterogeneous program, the garbage collection features associated with a subset of the program components are preserved through multiple calls to and from program components written in a legacy programming language.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method comprising:
   identifying points of transition between garbage collected program components and non-garbage collected program components of a heterogeneous program; and
   selectively invoking a transition function to maintain a traceable history of a select pointer and state information across a plurality of calls to non-garbage collected program components to support garbage collection throughout execution of the heterogeneous program.

2. A computer-implemented method according to claim 1, further comprising invoking a creation function within the transition function at a call from a garbage collected program component to a non-garbage collected program component.

3. A computer-implemented method according to claim 2, wherein the creation function stores one or more of a stack pointer, a frame pointer, callee-save register information and/or a pointer to a prior transition record in the transition record.

4. A computer-implemented method according to claim 2, wherein the creation function stores a pointer to the transition record in a per-thread state.

5. A computer-implemented method according to claim 1, faker comprising invoking a restoration function wit the transition function at a return from a non-garbage collected program component to a garbage collected program component.

6. A computer-implemented method according to claim 5 wherein the restoration function performs:
   accessing a per-thread state; and
   identifying a pointer to a transition record containing select pointer and state information associated with an immediate past garbage collected program component.

7. A computer-implemented method according to claim 6, wherein the restoration function performs restoring the identified select pointer and state information to that contained in the transition record.

8. A computer-implemented method according to claim 6, wherein the restoration function retrieves a pointer to a past transition record from the transition record, and stores the pointer to the past transition record on the per-thread state, and pops the identified transition record from a stack frame.

9. A native code compiler which, when executed, implements a method according to claim 1.

10. A runtime environment for an advanced programming language which, when executed, implements a method according to claim 1.

11. A storage medium having stored thereon a plurality of executable instructions which, when executed, implement a method according to claim 1.

12. A method according to claim 2, wherein the creation function performs:
   creating a transition record; and
   storing the select pointer and state information in the created transition record.

13. A compiler stored as computer executable instructions on one or more computer-readable media, the compiler comprising;
   an analysis agent, to receive source code in an advanced programming language and identify points of transition to components written in a legacy programming language, wherein the analysis agent generates instructions to implement a transition function to maintain select pointer and state information through the transition to the legacy component and back; and
   one or more translation agents, to receive the analyzed source code, including the transition functions, and to generate executable code.

14. A compiler according to claim 13, wherein the analysis agent includes control logic to review the received source code and identify calls to legacy programming language components.

15. A compiler according to claim 14, wherein the control logic also identifies a return point to an advanced programming language component in a function call to a legacy programming language component.

16. A compiler according to claim 15, wherein the analysis agent generates code to implement a creation function where the call to the legacy programming language component is identified.

17. A compiler according to claim 16, wherein the creation function creates a transition record for each transition from an advanced programming language component to a legacy programming language component, and populates the transition record with select pointer and state information.

18. A compiler according to claim 17, wherein the creation function stores one or more of a stack pointer, a frame pointer, and callee-save register information in the transition record.

19. A compiler according to claim 17, wherein the creation function stores a pointer to the created transition record in a per-thread state.

20. A compiler according to claim 17, wherein the creation function loads a pointer to an immediately past transition record from the per-thread state and stores that information in the transition record.

21. A compiler according to claim 15, wherein the function call and the return point each represent transition points.

22. A compiler according to claim 21, wherein the analysis agent generates code to implement a restoration function at each transition point from a foreign function component to an advanced programming language component.

23. A compiler according to claim 22, wherein the restoration function accesses a per-thread state of a thread within a program and loads a pointer to a transition record associated with the immediate past advanced programming language component in the thread.

24. A compiler according to claim 23, wherein the restoration function restores select pointer and state information stored within the transition record.

25. A compiler according to claim 23, wherein the restoration function retrieves a pointer to a prior transition record from the identified transition record, stores the pointer to the prior transition record in the per-thread state, and pops the identified transition record from a stack frame.

26. A compiler according to claim 13, wherein the components written in the legacy programming language are foreign functions.

27. A compiler according to claim 13, wherein the compiler is a foreign code compiler.

28. A compiler according to claim 13, wherein the transition function includes a creation function.

29. A compiler according to claim 28, wherein the creation function creates a transition record to document select pointer and state information at each point of transition from an advanced programming language component to a legacy programming language component of the program.

30. A compiler according to claim 13, wherein the transition function includes a restoration function.

31. A compiler according to claim 30, wherein the restoration function accesses a pointer to a current transition record from a per-thread state.

32. A compiler according to claim 31, wherein the restoration function restores select pointer and state information associated with the immediate past advanced programming language component of the program, and pops the transition record identified in the per-thread state.

33. A storage medium having a plurality of executable instructions which, when executed, implement the compiler of claim 13.

34. A method for compiling a heterogeneous program, the method comprising:
receiving source code developed in an advanced programming language;
detecting calls to program components written in a legacy programming language;
automatically generating code to implement transition functions to preserve and restore select pointer and state information across program components written in the legacy programming language; and
modifying the received source code at the point of such calls with the code to implement the transition functions.

35. A method according to claim 34, further comprising translating the source code modified with the transition functions to an executable form.

36. A method according to claim 34, further comprising selectively invoking a creation function within a transition function.

37. A method according to claim 36, wherein the creation function performs creating a transition record to store select pointer and state information through execution of the program component written in the legacy programming language.

38. A method according to claim 34, further comprising selectively invoking a restoration function within a transition function.

39. A method according to claim 38, further comprising inserting the restoration function at a point where a legacy programming language component returns to an advanced programming language component to restore select pointer and state information saved in a transition record created by an immediately prior advanced programming language component.

40. A storage medium having stored thereon a plurality of executable instructions which, when executed, implement the method of claim 34.

41. A computer-executable program stored as computer executable instructions on one or more computer-readable media, the program comprising;
a plurality of components written in a garbage collected language;
a plurality of components written in a non-garbage collected language; and
one or more transition functions automatically generated and placed by a compiler at transition points between a garbage collected program component and a non-garbage collected program component identified by the compiler, wherein the transition functions preserve select pointer and state information supporting automatic memory management across a plurality of calls between the garbage collected components and the non-garbage collected components of the program.

42. A computer-executable program according to claim 41, wherein a transition function includes a creation function inserted between a call from a garbage collected component to a non-garbage collected component, to create a transition record and to save the select pointer and state information in the transition record.

43. A computer executable program according to claim 42, wherein the creation function accesses a per-thread state to identify pointers to transition records associated with immediate past garbage collected components.

44. A computer executable program according to claim 43, wherein the creation function stores a pointer to the transition record associated with an immediate past garbage collected component in the transition record.

45. A computer executable program according to claim 42, wherein the creation function stores a pointer to the transition record in a per-thread state.

46. A computer executable program according to claim 41, wherein a transition function includes a restoration function, inserted between a return from a non-garbage collected component to a garbage collected component, to restore select pointer and state information from a transition record associated with an immediate past garbage collected component.

47. A computer executable program according to claim 43, wherein the restoration function accesses a per-thread state to identify a pointer to a transition record associated with an immediate past garbage collected component.

48. A computer executable program according to claim 47, wherein the restoration function restores select pointer and state information from the transition record.

49. A computer executable program according to claim 47, wherein the restoration function retrieves a pointer to a transition record associated with a past garbage collected component from a transition record identified in the per-thread state, and stores a pointer to the transition record associated with the past garbage collected component in the per-thread state, and pops the identified transition record.

50. A storage medium having stored thereon a plurality of executable instructions which, when executed, implement the computer executable program of claim 41.

* * * * *

UNITED STATES PATENT AND TRADEMARK OFFICE
CERTIFICATE OF CORRECTION

PATENT NO. : 6,625,808 B1
DATED : September 23, 2003
INVENTOR(S) : Tarditi

It is certified that error appears in the above-identified patent and that said Letters Patent is hereby corrected as shown below:

Column 13,
Line 46, delete "/" between "for" and "that".

Column 15,
Line 37, replace "faker" with -- further --.
Line 37, replace "wit" with -- within --.

Column 18,
Line 41, replace number "43" with number -- 46 --.

Signed and Sealed this

Ninth Day of March, 2004

JON W. DUDAS
*Acting Director of the United States Patent and Trademark Office*